United States Patent
Nakamura

(10) Patent No.: US 7,586,203 B2
(45) Date of Patent: Sep. 8, 2009

(54) VEHICLE-USE GENERATOR

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 429 days.

(21) Appl. No.: 11/509,647

(22) Filed: Aug. 25, 2006

(65) Prior Publication Data

US 2007/0046265 A1 Mar. 1, 2007

(30) Foreign Application Priority Data

Aug. 29, 2005 (JP) ............... 2005-247678

(51) Int. Cl.
*F02N 11/00* (2006.01)
*H02P 9/00* (2006.01)
*H02P 11/00* (2006.01)
*H02K 49/00* (2006.01)

(52) U.S. Cl. .................. 290/38 R; 322/44; 322/59; 322/28; 310/92; 310/102 R

(58) Field of Classification Search ............ 322/24, 322/28, 44; 290/38 R; 310/263, 92, 95, 310/102 R See application file for complete search history.

(56) References Cited

U.S. PATENT DOCUMENTS

| 1,624,174 | A | * | 4/1927 | Lucarelle et al. ........ 192/18 A |
| 4,224,841 | A | * | 9/1980 | Crooks ................... 475/117 |
| 4,725,259 | A | | 2/1988 | Miyata |
| 5,982,068 | A | * | 11/1999 | Umeda et al. ............. 310/206 |
| 6,531,849 | B2 | | 3/2003 | Nakamura et al. |
| 6,700,354 | B2 | * | 3/2004 | Okuno et al. .............. 322/29 |
| 2002/0047362 | A1 | * | 4/2002 | Nakamura et al. ........ 310/68 R |
| 2003/0107351 | A1 | * | 6/2003 | Taniguchi et al. ........... 322/36 |
| 2006/0030454 | A1 | * | 2/2006 | Uchisasai et al. ........... 477/77 |

FOREIGN PATENT DOCUMENTS

| DE | 199 56 934 A1 | 5/2001 |
| DE | 601 01 187 T2 | 7/2004 |
| EP | 0 881 746 A2 | 12/1998 |
| JP | B2-07-072585 | 8/1995 |
| JP | A-2001-193515 | 7/2001 |
| JP | A-2002-051593 | 2/2002 |

* cited by examiner

*Primary Examiner*—Julio C. Gonzalez
(74) *Attorney, Agent, or Firm*—Oliff & Berridge, PLC

(57) ABSTRACT

The vehicle-use generator includes a rotor rotatably mounted on a shaft and having a field coil wound therearound, a stator having stator winding wound therearound and fixedly disposed so as to form a gap with the rotor, a cooling fan mounted to the rotor, a pulley belt-driven by a vehicle engine and coupled to the shaft through an overrunning clutch provided therein, and a power generation control device controlling an excitation current flowing into the field coil. The overrunning clutch is configured to idle when a rotational speed of the pulley is lower than a rotational speed of the rotor to inhibit torque transmission from the pulley to the rotor, and the power generation control device is configured to forcibly increase the excitation current on a temporary basis when an upshift operation of a transmission of the vehicle is performed.

9 Claims, 5 Drawing Sheets

VEHICLE-USE GENERATOR

CROSS-REFERENCE TO RELATED APPLICATION

This application is related to Japanese Patent Application No. 2005-247678 filed on Aug. 29, 2005, the contents of which are hereby incorporated by reference.

BACKGROUND OF THE INVENTION

1. Field of the Invention

The present invention relates to a generator (alternator) that can be mounted on a vehicle such as a passenger car or a truck.

2. Description of Related Art

With the progress of computerization in automobiles, many mechanical functions of the automobiles have been replaced by electric or electronic functions. Under such condition, electric power demands of the automobiles are increasing more and more, which causes vehicle generators to increase in size. Accordingly, the rotors of the vehicle generators are also increasing in size, causing inertia moments thereof to increase.

Meanwhile, the serpentine belt drive system in which auxiliaries of a vehicle including a vehicle generator are belt-driven by a vehicle engine through the same single belt is becoming widespread for adaptation to the trend of reducing the size of an engine room of a vehicle in an effort to provide a sufficiently large cabin space. Such a serpentine belt drive system has a mechanism, which is known as the auto tensioner, for absorbing belt tension variation to keep belt tension constant. Since the auto tensioner can prevent the belt tension from lowering over time, it is common that the belt tension is set at a low value in a vehicle having the serpentine belt drive system.

Incidentally, in view of fuel consumption reduction as one measure of environmental protection, there is a tendency to set an idling speed of an engine of a vehicle at a lower value, because idling of the engine does not contribute to traveling of the vehicle, and the frequency with which the engine runs at the idling speed is high. Also, in order to clean an exhaust gas of a diesel engine, use of the common rail system, which causes the pressure in combustion chambers of the engine to increase considerably, is spreading.

As a result of these factors intertwined, the rotational speed of a recent vehicle engine tends to easily fluctuate in its idle range in synchronization with the explosion cycle thereof. This idling speed fluctuation causes belt tension variation due to inertia torque variations of various belt-driven auxiliaries to increase. Especially, the inertia torque variation of a vehicle generator has a large effect on the belt tension variation, because the inertia moment and pulley ratio of the vehicle generator are large compared to other belt-driven auxiliaries. The increase of the belt tension variation causes the auto tensioner to oscillate with a large amplitude. As a result, there arise problems that the auto tensioner can interfere with other auxiliaries, a large noise is produced due to flattering or slippage of the belt, and the lives of the belt and the auto tensioner are shortened.

To cope with such problems, generators of some vehicles are provided with, in the pulleys thereof, an overrunning clutch that transmits a torque in one way (refer to Japanese Patent Examined Application Publication No. 7-72585, for example). The pulley provided with the overrunning clutch offers the following advantages.

While an engine speed is decreasing, if the rotational speed of a rotor of a vehicle generator exceeds a rotational speed of the pulley, the overrunning clutch idles, so that the rotational speed of the pulley decreases smoothly together with the engine. On the other hand, even while the engine speed is increasing, the overrunning clutch keeps idling until the rotational speed of the pulley reaches the rotational speed of the rotor. This makes it possible to prevent an inertia torque due to an inertia moment of the rotor from transmitting to the pulley, so that abrupt decrease of the belt tension on a stretched side and abrupt increase of the belt tension on a loosened side can be suppressed. As a result, it becomes possible to prevent the auto tensioner from oscillating with a large amplitude, suppress noise due to belt slippage, and prevent the belt from being damaged early on.

However, the use of the pulley provided with the overrunning clutch causes the following problem.

The rotor of a vehicle generator disconcerted from a vehicle engine by the action of the overrunning clutch keeps idling for a certain time period even after the vehicle engine is stopped. Since the rotor of the vehicle generator keeps rotating together with a cooling fan mounted thereto during this time period in a state that the vehicle engine and other auxiliaries in the same engine room are all stopped, and since the rotor generally includes Lundell type magnetic poles having a cooling fan effect, the sound of the rotating rotor, and the wind noise of the cooling fan or the magnetic poles which are harsh to hear become conspicuous during this time period.

To cope with this problem, it is known to pass a current to a field coil of a vehicle generator upon detecting an engine stop state in order to reduce the time needed for the rotor of the vehicle generator to stop, as disclosed in Japanese Patent Application Laid-open No. 2002-51593, for example).

The noise reduction technique disclosed in this patent document exerts effect on the noise caused by the rotor rotating idly when the engine is in a stopped state. However, this noise reduction technique cannot cope with the noise produced during a time period in which a vehicle transmission is upshifted several times consecutively while a gas pedal is depressed, as explained below.

In this time period, an engine speed decreases rapidly each time the vehicle transmission is upshifted, while the rotor continues to rotate idly at high speed for a while due to its inertia, although it gradually slows down. While the rotor rotates idly at high speed, since the rotation noise of the rotor, wind noises of the cooling fan and the magnetic poles, and interference noise of the cooling air interfering with the stator disposed outwardly of the rotor are high-pitched, they are easily heard harshly. It should be noted that the frequency with which the gas pedal is depressed causing the transmission to be upshifted is much larger than the frequency with which the engine is stopped.

SUMMARY OF THE INVENTION

The present invention provides a vehicle-use generator includes:

a rotor rotatably mounted on a shaft and having a field coil wound therearound;

a stator having stator winding wound therearound and fixedly disposed so as to form a gap with the rotor;

a cooling fan mounted to the rotor;

a pulley belt-driven by a vehicle engine and coupled to the shaft through an overrunning clutch provided therein; and a power generation control device controlling an excitation current flowing into the field coil such that an output voltage of the vehicle-use generator is kept at a target regulation voltage;

wherein the overrunning clutch is configured to idle when a rotational speed of the pulley is lower than a rotational speed of the rotor to inhibit torque transmission from the pulley to the rotor, and the power generation control device is configured to forcibly increase the excitation current on a temporary basis when an upshift operation of a transmission of the vehicle is performed.

The rotor may have a pair of Lundell type magnetic pole cores having a plurality of claw portions serving as magnetic poles, the field coil being put between the Lundell type magnetic pole cores.

The power generation control device may be configured to return the excitation current to a normal value for keeping the output voltage of the vehicle-use generator at the target regulation voltage upon detecting completion of the upshift operation.

The power generation control device may include a signal receiving section, and configured to forcibly increase the excitation current when the signal receiving section receives an upshift signal indicative of completion of the upshift operation sent from an external control unit mounted on the vehicle.

The power generation control device may be configured to increase the target regulation voltage to forcibly increase the excitation current when the upshift operation is performed.

The power generation control device may be configured to adjust the excitation current in order that a difference between a rotational speed of the pulley and a rotational speed of the rotor is kept within a predetermined value while the upshift operation is performed.

The stator winding may be configured by a plurality of segment conductors whose straight portions are inserted into slots formed in a stator core of the rotor, and end portions of the segment conductors protruding from the slots and configuring a coil end of the stator winding may have a mesh-like structure facing the rotor.

According to the invention in which an upshift operation of a vehicle transmission is performed causing the rotational speed of a vehicle engine to decrease rapidly, and accordingly, causing the rotor of a vehicle generator to rotate idly, the rotational speed of the rotor is decreased rapidly by increasing an excitation current flowing into the field coil of the vehicle generator to thereby temporarily increase the power generation torque of the vehicle generator, it becomes possible to sufficiently suppress the noise caused by the rotor rotating idly when the upshift operation of the vehicle transmission is performed.

Other advantages and features of the invention will become apparent from the following description including the drawings and claims.

PREFERRED EMBODIMENTS OF THE INVENTION

Figure 1:
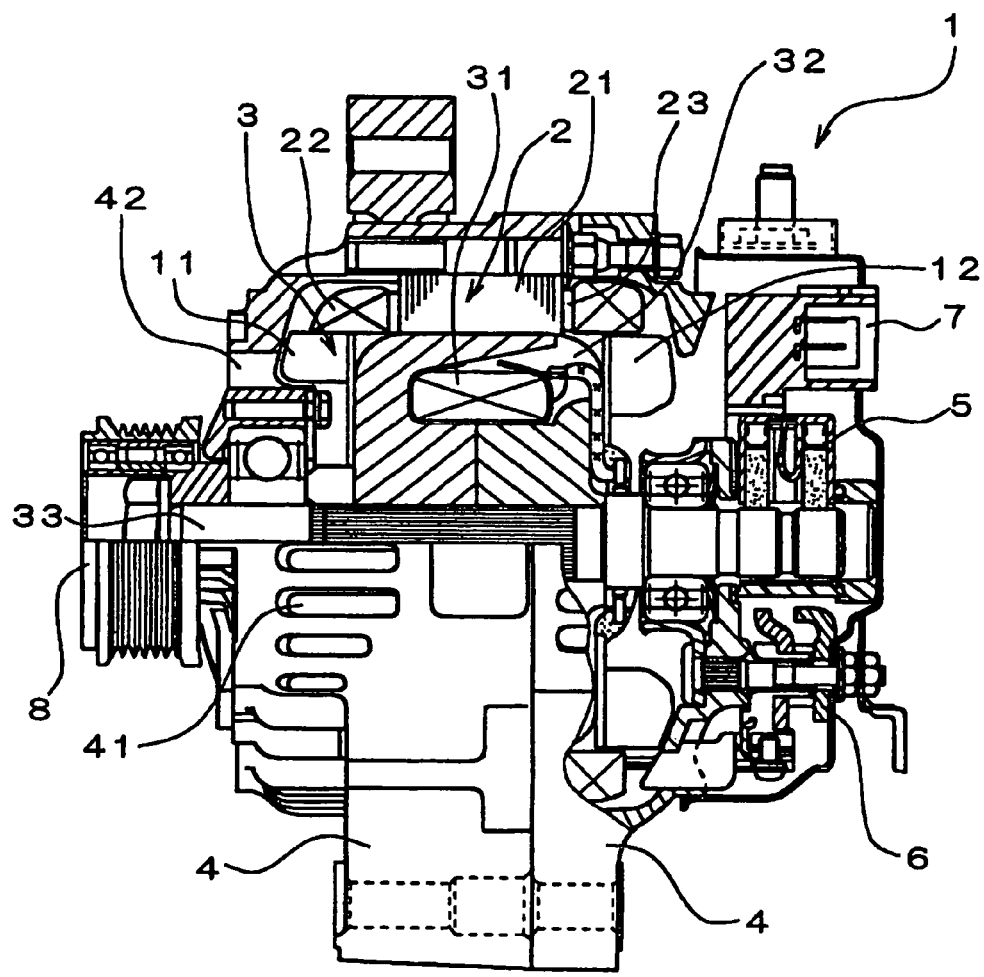
FIG. 1 is a half-cross sectional view of a vehicle-use generator according to an embodiment of the invention.

FIG. 1 is a half-cross sectional view of a vehicle-use generator 1 according to an embodiment of the invention. The vehicle-use generator 1 is constituted mainly by a stator 2, a rotor 3, a frame 4, a brush device 5, a rectifier 6, a regulator 7, and a pulley 8.

The stator 2 includes a stator core 21, a three-phase stator winding 22, and an insulator 23 for insulation between the stator core 21 and the stator winding 22. The stator core 21, which is made of laminated steel plates having a certain thickness, is formed with slots at a constant pitch in its inner circumferential surface. The three-phase stator winding 22 is wound in the slots.

The rotor 3 includes a pair of Lundell type magnetic pole cores 32 having a plurality of claw portions serving as magnetic poles and mounted to a shaft 33, and a field coil 31 made of an insulated copper wire wound in the cylindrical shape between the Lundell type magnetic pole cores 32. An axial cooling fan 11 is mounted by welding to the end surface of the front-side magnetic pole core 32 in order to suck in cooling air from the front side, and blow it in the axial direction and the radial direction. Likewise, a centrifugal cooling fan 12 is mounted by welding to the end surface of the rear-side magnetic pole core 32 in order to suck in cooling air from the rear side, and blow it in the radial direction. Both of the cooling fans 11 and 12 may be of the centrifugal type. In this case, by making the blowing power of the cooling fan 12 larger than that of the cooling fan 11, it becomes possible to push a part of the cooling air sucked in from the front side towards the rear side in the axial direction.

The frame 4 houses the rotor 3 rotatable around the shaft 33, and the stator 2 disposed outwardly of the rotor 3 so as to form a circumferential gap therebetween. The frame 4 is formed with cooling air discharge windows 41 in a portion thereof facing the stator winding 22 of the stator 2, and cooling air intake windows 42 at the front-side end surface thereof. The rectifier 6 includes a three-phase full-wave rectifying circuit for full-wave rectifying the three-phase AC voltage induced in the stator winding 22 to a DC voltage as an output voltage of the vehicle-use generator 1.

The regulator 7 on/off controls an excitation current flowing to the field coil 31 to keep the output voltage of the vehicle-use generator 1 at a constant value. In this embodiment, the regulator 7 is connected to an external ECU (Electronic Control Unit) 96 (see FIG. 2), so that it can operate as a power generation control device capable of forcibly increasing the excitation current when a transmission of a vehicle on which the vehicle-use generator 1 is mounted is upshifted, and after completion of the upshift operation, returning the excitation current to a normal value for keeping the output voltage of the vehicle-use generator 1 at a predetermined target regulation voltage.

The pulley 8, which is coupled to the rotor 3 and belt-driven by a crank shaft of a vehicle engine (not shown), is provided with an overrunning clutch mechanism. The overrunning clutch mechanism is configured to allow a driving force to transmit from the pulley 8 to the rotor 3 when the rotational speed of the pulley 8 is higher than that of the rotor 3, and to inhibit the driving force to transmit from the pulley 8 to the rotor 3 when the rotational speed of the pulley 8 is lower than that of the rotor 3.

Figure 2:
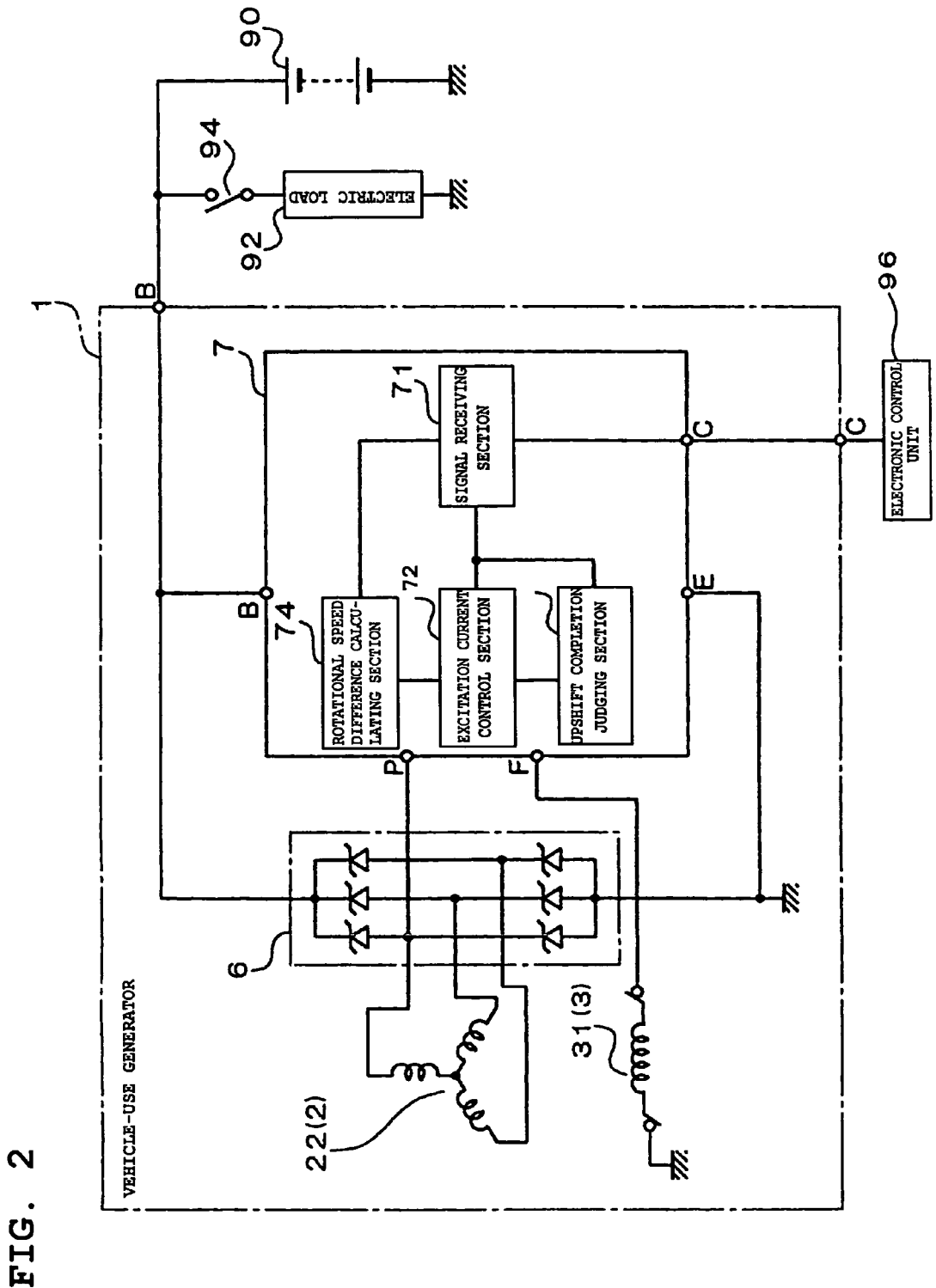
FIG. 2 is a block diagram showing an electric structure of the vehicle-use generator according to the embodiment of the invention.

FIG. 2 is a block diagram showing an electric structure of the vehicle-use generator 1. The field coil 31 wound around the rotor 3 rotates in synchronization with the engine to generate a rotating magnetic field. The stator winding 22, which is wound around the stator core 21 disposed outwardly of the rotor 3 so as to form a circumferential gap therebetween, generates a three-phase sinusoidal voltage having a value depending on the magnitude of the rotating magnetic field generated by the field coil 31. This voltage is full-wave rectified by the rectifier 6. The DC voltage outputted from the rectifier 6 is supplied to a battery 90 through an output terminal B, and as a result, the battery 90 is charged. The DC voltage outputted from the rectifier 6 is also supplied to an electric load 92 such as a lamp through a load switch 94.

The regulator 7 is connected to the ECU 96 through a communication terminal C. The ECU 96 has a function of controlling the rotation of the engine and a function of controlling the timing to upshift or downshift the transmission. When the transmission is upshifted, the ECU 96 sends an upshift signal, and a rotational speed signal indicative of the rotational speed of the engine to the regulator 7.

The regulator 76 includes a signal receiving section 71, an excitation current control section 72, an upshift completion judging section 73, and a rotational speed difference calculating section 74. The signal receiving section 71 receives various signals including the upshift signal and the rotational speed signal sent from the ECU 96. The excitation current control section 72 controls the excitation current flowing through the field coil 31 by on/off controlling a switching transistor (not shown). Normally, the excitation current control section 72 controls the excitation current in order that the output voltage of the vehicle-use generator 1 is kept at the target regulation voltage. When it is necessary to forcibly increase the excitation current, the target regulation voltage is changed from a normal value to a high value. The upshift completion judging section 73 makes a judgment that an upshift operation has been completed when a predetermined time (five seconds, for example) has elapsed since the reception of the upshift signal. The rotational speed difference calculating section 74 calculates the difference between the rotational speed of the rotor 3 that can be determined, for example, from the frequency of the voltage induced in the stator winding 22, and the pulley rotational speed which is the engine speed multiplied by the pulley ratio.

Next, the operation of the vehicle-use generator 1 having the above described structure is explained.

When the transmission is upshifted, the engine speed decreases rapidly, while the rotor 3 rotates idly because of the action of the overrunning clutch mechanism of the pulley 8. In this embodiment, when the transmission is upshifted, the excitation current flowing through the field coil 31 is increased, so that the power generation torque of the vehicle-use generator 1 increases temporarily, to thereby rapidly decrease the rotational speed of the rotor 3, as explained in detail below.

When the transmission is upshifted, the ECU 96 sends the upshift signal to the signal receiving section 71 of the regulator 7. The excitation current control section 72 operates to increase the generation voltage (output voltage of the vehicle-use generator 1) by increasing the target regulation voltage, upon detecting that the upshift signal has been received by the signal receiving section 71. As a result of this operation, the excitation current is forcibly increased.

The control for forcibly increasing the excitation current performed by the excitation current control section 72 may be continued until the upshift competition judging section 73 makes a judgment that the upshift operation has been completed (referred to as "control pattern A" hereinafter), or until the transmission is upshifted for the second time, that is, until the upshift signal is received for the second time in a case where the transmission is upshifted several times consecutively (referred to as "control pattern B" hereinafter).

Alternatively, the excitation current control section 72 may be so configured as to forcibly increase the excitation current when the transmission is upshifted for the first time, and decrease the excitation current each time the transmission is upshifted thereafter in a case where the transmission is upshifted several times consecutively (referred to as "control pattern C" hereinafter).

However, since it is impossible to known in advance whether the transmission will be upshifted only once, or several times consecutively, it is preferable that each of the control pattern B and the control pattern C allows to stop the control for forcibly increasing the excitation current when the upshift completion judging section 73 makes a judgment that the upshift operation has been completed.

Figure 3:
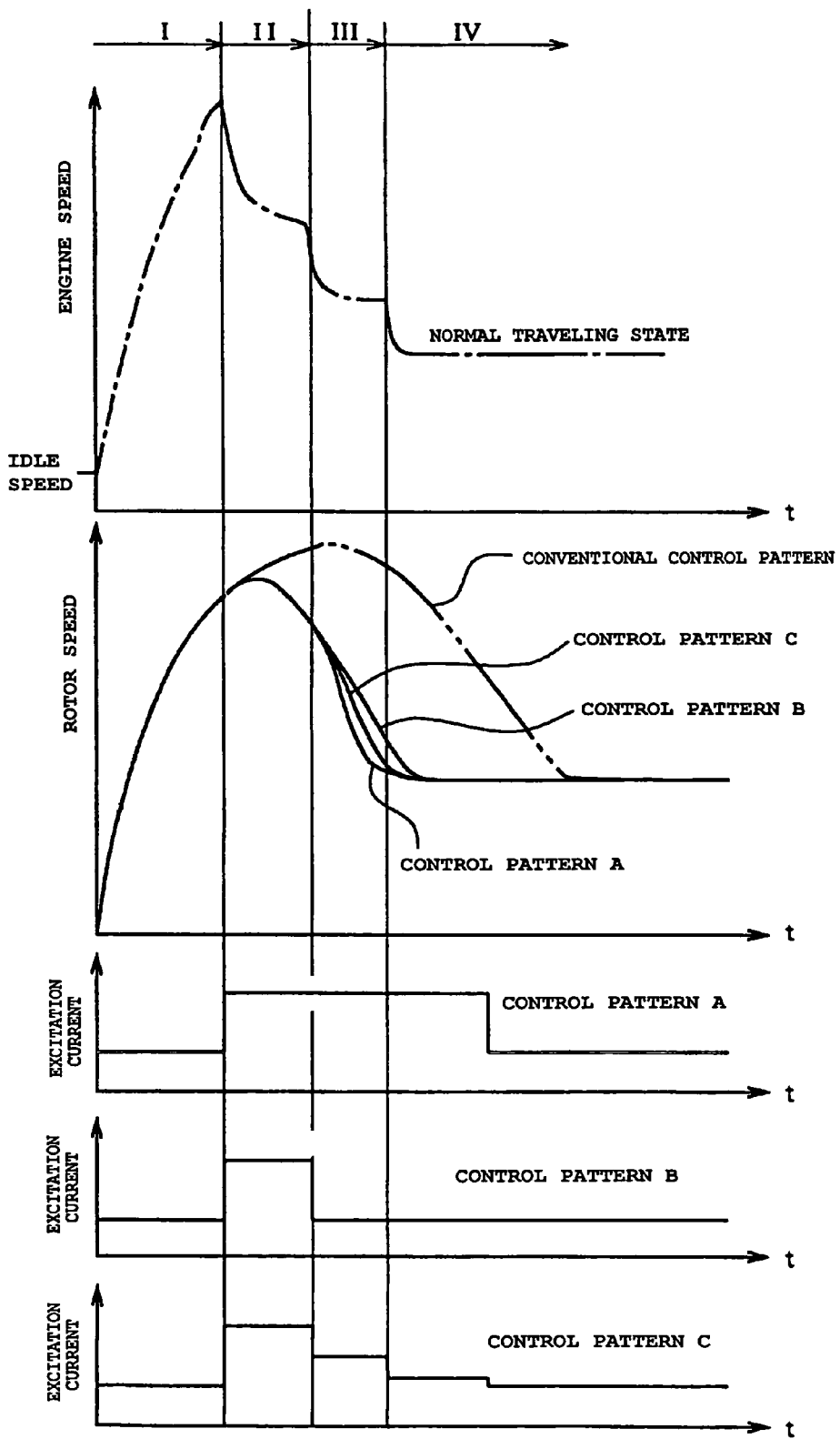
FIG. 3 is a diagram showing how the rotational speed of a vehicle engine driving the vehicle-use generator, the rotational speed of a rotor of the vehicle-use generator, and an excitation current of the vehicle-use generator vary with the progress of an upshift operation of a transmission of the vehicle engine.

FIG. 3 is a diagram showing how the rotational speeds of the engine and the rotor 3, and the excitation current vary with the progress of the upshift operation for each of a case of the control patter A, a case of control pattern B, a case of control pattern C, and a case of a conventional control pattern in which the excitation current is not forcibly increased. Here, it is assumed that the electric load 92 is stable, and accordingly, the excitation current is constant before and after the upshift operation in which the transmission is shifted in the sequence of a neutral gear position→a first gear position (I)→a second gear position (II)→third gear position (III)→a fourth gear position (IV).

As shown in FIG. 3, when the transmission is shifted from the neutral gear position to the first gear position, the engine speed increases rapidly, and then decreases gradually with the progress of the upshift operation.

It is also assumed that the time period between the time when the transmission is shifted to the second gear position and the time when the transmission is shifted to the third gear position, and the time period between the time when the transmission is shifted to the third gear position and the time when the transmission is shifted to the fourth gear position are shorter than a predetermined time, and accordingly the upshift operation completion judging section 73 does not make a judgment that the upshift operation has been completed.

In the case of the control pattern A, the control for forcibly increasing the excitation current is performed from the time when the transmission is shifted from the first gear position to the second gear position until a predetermined time elapses since the transmission is upshifted for the last time. In the case of the control pattern B, the control for forcibly increasing the excitation current is performed from the time when the transmission is shifted from the first gear position to the second gear position until the transmission is shifted from the second gear position to the third gear position. In the case of the control pattern C, the control for forcibly increasing the excitation current is performed when the transmission is shifted from the first gear position to the second gear position, and thereafter, the excitation current is decreased when the transmission is shifted from the second gear position to the third gear position and when the transmission is shifted from the third gear position to the fourth gear position.

As previously explained, since the overrunning clutch mechanism makes it possible to prevent the inertia torque due to the inertia moment of the rotor from transmitting to the pulley, abrupt decrease or increase of the belt tension can be suppressed. Accordingly, in accordance with this embodiment, it is possible to prevent the auto tensioner from oscillating with a large amplitude, suppress noise due to belt slippage, and prevent the belt from being damaged early on. In addition, in accordance with this embodiment, the noise emitted by the rotor 3 rotating idly at a speed higher than the rotational speed of the pulley when the transmission is upshifted can be sufficiently suppressed, because the rotational speed of the rotor 3 can be rapidly decreased. Furthermore, since the excitation current forcibly increased is promptly returned to a normal value when the completion of the upshift operation is detected, it is possible to prevent the excessively large excitation current flows continuously.

It is a matter of course that various modifications can be made to the above described embodiment as described below. The regulator 7 may be so configured as to increase the excitation current itself to an allowable maximum value instead of increasing the target regulation voltage of the vehicle-use generator 1 when the transmission is upshifted. In this case, some appropriate means for detecting the value of the excitation current is needed. Such means may be a current measuring resistor series-connected to the switching transistor through which the excitation current flows into the field coil 31.

Alternatively, a high voltage source different from a normal vehicle battery may be provided for supplying the large excitation current when the transmission is upshifted. Such a high voltage source may be a high voltage battery configured to be charged by the output voltage of the vehicle-use generator 1 while the target regulation voltage is increased. In this case, by selecting one of supplying the excitation current from the high voltage battery, and increasing the target regulation voltage, it becomes possible to utilize the increase of the output power of the vehicle-use generator 1 when the transmission is upshifted.

Furthermore, the regulator 7 may be so configured as to adjust the excitation current in order that the difference between the rotational speed of the rotor 3 and the rotational speed of the pulley (engine speed) is within a predetermined value when the transmission is upshifted. In this case, the excitation current control section 72 may adjust the excitation current in accordance with the output of the rotational speed difference calculating section 74 that calculates the difference between the rotational speed of the rotor 3 which can be determined, for example, from the frequency of the voltage induced in the stator winding 22, and the pulley rotational speed which is the engine rotational speed multiplied by the pulley ratio.

Figure 4:
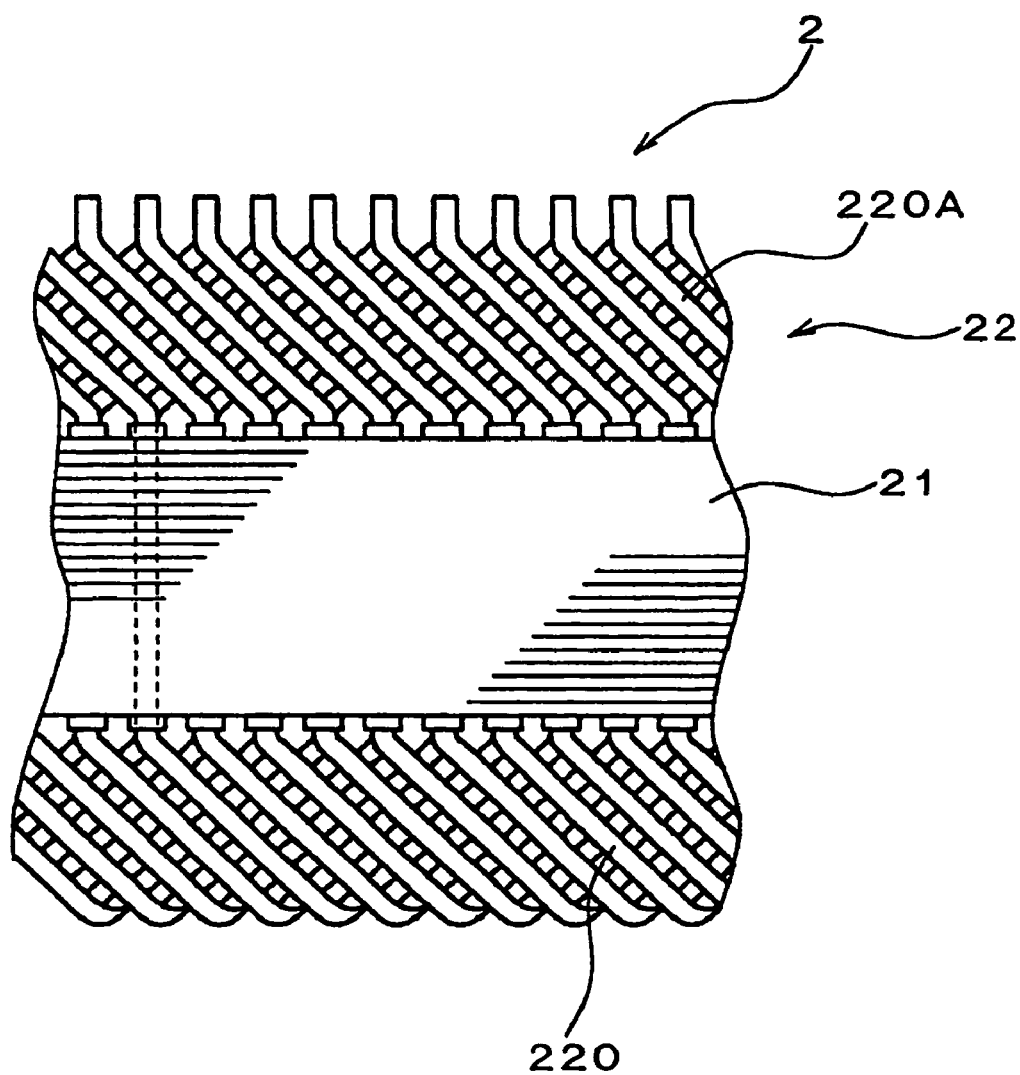
FIG. 4 is a partial development view of a stator usable for the vehicle-use generator according to the embodiment of the invention as viewed from outside.
Figure 5:
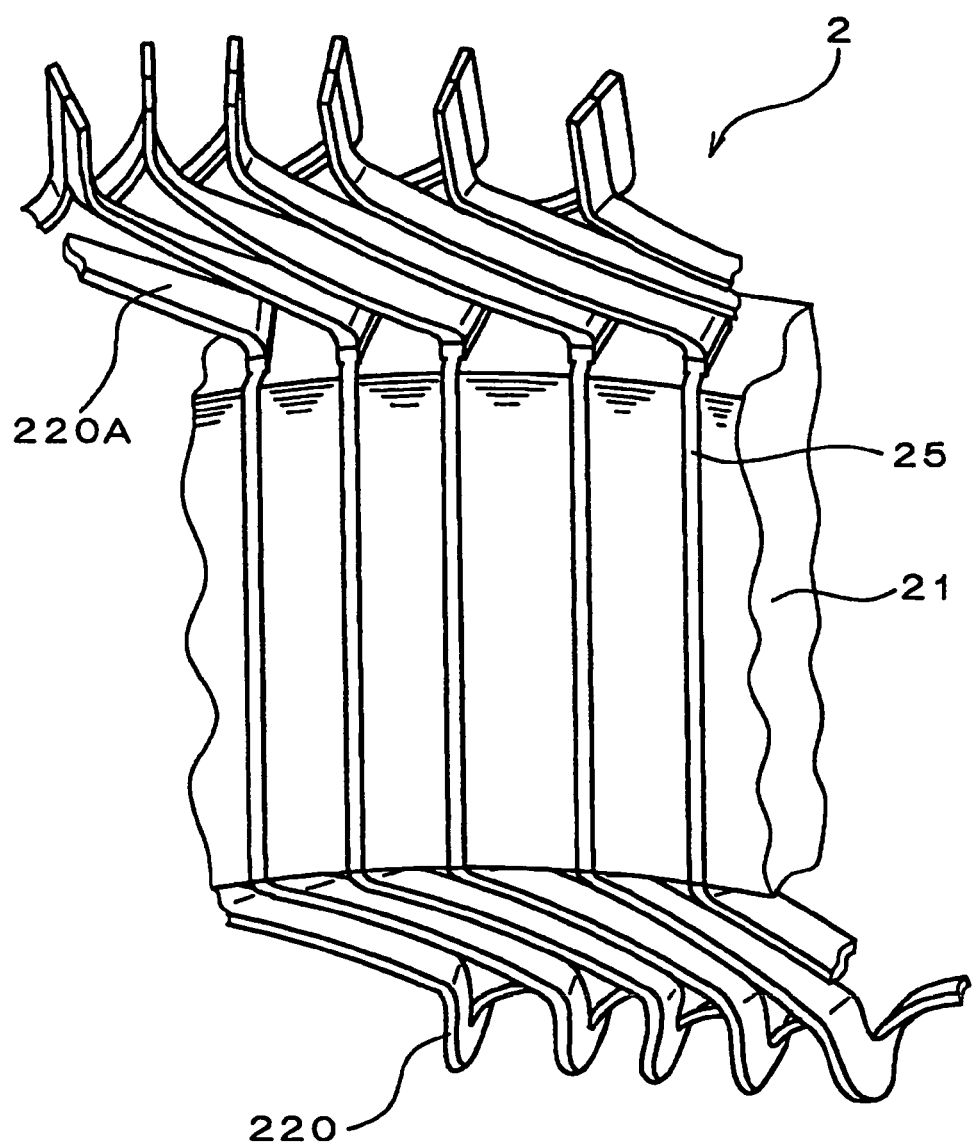
FIG. 5 is a partial perspective view of the stator shown in FIG. 4 as viewed from inside.

The stator winding 22 of the stator 2 may be configured by a plurality of segment conductors connected one another at their ends as shown in FIG. 4 and FIG. 5.

FIG. 4 is a partial development view of the stator 2 having the stator winding 22 having such a configuration as viewed from outside, and FIG. 5 is a partial perspective view of this stator 2 as view from inside. As shown in these figures, the stator winding 22 is configured by a plurality of U-shaped segment conductors 220 whose straight portions are inserted into different slots 25 formed in the stator core 21 and whose front-side portions 220A extending from the straight portions are circumferentially inclined. Each two front-side portions 220A whose ends are adjacent in the radial direction are electrically connected to each other. The front-side portions 220A in the same radial position are circumferentially inclined by the same angle so that their ends are evenly spaced. Each two front-side portions 220A adjacent in the radial direction are circumferentially inclined in the opposite directions. Accordingly, the coil end of the stator winding 22 configured by the front-side end portions 220A of the segment conductors 220 protruding from the slots 25 of the stator core 21 has a mesh-like structure facing the rotor 3.

Since the mesh-like structure of the coil end of the stator winding 22 has a windshield effect, the noise emitted from the rotor 3 rotating idly when the transmission is upshifted can be further reduced.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use generator comprising:
   a rotor rotatably mounted on a shaft and having a field coil wound therearound;
   a stator having a stator winding wound therearound and fixedly disposed so as to form a gap with the rotor;
   a cooling fan mounted to said rotor;
   a pulley belt-driven by a vehicle engine and coupled to said shaft through an overrunning clutch provided therein; and
   a power generation control device controlling an excitation current flowing into said field coil such that an output voltage of said vehicle-use generator is kept at a target regulation voltage, wherein:
   said overrunning clutch is configured to idle when a rotational speed of said pulley is lower than a rotational speed of said rotor to inhibit torque transmission from said pulley to said rotor, and said power generation control device is configured to forcibly increase said excitation current on a temporary basis when an upshift operation of a transmission of said vehicle is performed; and
   said rower generation control device is configured to adjust said excitation current in order that a difference between a rotational speed of said pulley and a rotational speed of said rotor is kept within a predetermined value while said upshift operation is performed.

2. The vehicle-use generator according to claim 1, wherein said rotor has a pair of Lundell type magnetic pole cores having a plurality of claw portions serving as magnetic poles, said field coil being put between said Lundell type magnetic pole cores.

3. The vehicle-use generator according to claim 1, wherein said power generation control device is configured to return said excitation current to a normal value for keeping said output voltage of said vehicle-use generator at said target regulation voltage upon detecting completion of said upshift operation.

4. The vehicle-use generator according to claim 1, wherein said power generation control device is configured to increase said target regulation voltage to forcibly increase said excitation current when said upshift operation is performed.

5. The vehicle-use generator according to claim 1, wherein said stator winding is configured by a plurality of segment conductors whose straight portions are inserted into slots formed in a stator core of said rotor, and end portions of said segment conductors protruding from said slots and configuring a coil end of said stator winding has a mesh-like structure facing said rotor.

6. A vehicle-use generator comprising:

a rotor rotatably mounted on a shaft and having a field coil wound therearound;

a stator having a stator winding wound therearound and fixedly disposed so as to form a gap with the rotor;

a cooling fan mounted to said rotor;

a pulley belt-driven by a vehicle engine and coupled to said shaft through an overrunning clutch provided therein; and a power generation control device controlling an excitation current flowing into said field coil such that an output voltage of said vehicle-use generator is kept at a target regulation voltage, wherein:

said overrunning clutch is configured to idle when a rotational speed of said pulley is lower than a rotational speed of said rotor to inhibit torque transmission from said pulley to said rotor, and said power generation control device is configured to forcibly increase said excitation current on a temporary basis when an upshift operation of a transmission of said vehicle is performed, said power generation control device is configured to return said excitation current to a normal value for keeping said output voltage of said vehicle-use generator at said target regulation voltage upon detecting completion of said upshift operation, and said power generation control device includes a signal receiving section, and is configured to forcibly increase said excitation current when said signal receiving section receives an upshift signal indicative of completion of said upshift operation sent from an external control unit mounted on said vehicle.

7. The vehicle-use generator according to claim 6, wherein said rotor has a pair of Lundell type magnetic pole cores having a plurality of claw portions serving as magnetic poles, said field coil being put between said Lundell type magnetic pole cores.

8. The vehicle-use generator according to claim 6, wherein said power generation control device is configured to increase said target regulation voltage to forcibly increase said excitation current when said upshift operation is performed.

9. The vehicle-use generator according to claim 6, wherein said stator winding is configured by a plurality of segment conductors whose straight portions are inserted into slots formed in a stator core of said rotor, and end portions of said segment conductors protruding from said slots and configuring a coil end of said stator winding has a mesh-like structure facing said rotor.

* * * * *